United States Patent [19]

Strom

[11] Patent Number: 4,802,042
[45] Date of Patent: Jan. 31, 1989

[54] SIDE-VENTED MAGNETIC HEAD AIR BEARING SLIDER

[75] Inventor: Richard A. Strom, Eagan, Minn.

[73] Assignee: Magnetic Peripherals Inc., Minneapolis, Minn.

[21] Appl. No.: 11,655

[22] Filed: Feb. 5, 1987

[51] Int. Cl.$^4$ .................. G11B 5/60; G11B 17/32; G11B 21/21
[52] U.S. Cl. .................................................. 360/103
[58] Field of Search ............................. 360/103, 102

[56] References Cited

U.S. PATENT DOCUMENTS

| | | | |
|---|---|---|---|
| 3,678,482 | 7/1972 | Billawala | 360/103 |
| 3,855,625 | 12/1974 | Garnier et al. | 360/103 |
| 4,081,846 | 3/1978 | Roscamp et al. | 360/103 |
| 4,218,715 | 8/1980 | Garnier | 360/103 |
| 4,420,780 | 12/1983 | Deckert | 360/103 |
| 4,475,135 | 10/1984 | Warner et al. | 360/103 |
| 4,553,184 | 11/1985 | Ogishina | 360/103 |
| 4,555,739 | 11/1985 | DeVan et al. | 360/103 |
| 4,644,641 | 2/1987 | Verdone | 360/103 |
| 4,646,180 | 2/1987 | Ohtsubo | 360/103 |

OTHER PUBLICATIONS

IBM Technical Disclosure Bulletin, "Magnetic Disk Storage System with Structured Magnetic Head Slider", vol. 27, No. 10A, Mar. 1985, pp. 5820–5821.
Yoneoka et al., "Design Considerations for Negative Pressure Head Sliders", Fujitsu Sci. Tech. J., 21, 1, pp. 40–49, Mar. 1985.

*Primary Examiner*—John H. Wolff
*Assistant Examiner*—Matthew J. Bussan
*Attorney, Agent, or Firm*—Joseph A. Genovese; Edward P. Heller

[57] ABSTRACT

A self-loading negative pressure air bearing slider is formed having side vents. The side vents allow for repeatable manufacturing of the basic slider in fewer steps while retaining the desirable features of high stiffness and substantially constant flying height found in negative pressure air bearing sliders.

3 Claims, 3 Drawing Sheets

SIDE-VENTED MAGNETIC HEAD AIR BEARING SLIDER

BACKGROUND

This invention relates to a transducer head assembly and more particularly to a self-loading negative pressure air bearing slider for magnetic heads.

Magnetic head assemblies that fly relative to magnetic disks have been used extensively. The objectives for improving the transducing relationship between a magnetic transducer and a magnetic disk include a close spacing between the transducer and the disk, and to maintain such spacing at a constant flying height Close spacing, when used with very narrow transducing gaps and very thin magnetic recording films, allows short wave-length, high-frequency signals to be recorded, thereby affording high density, high storage capacity recording.

In accessing disks, for example, the flying height of a magnetic head assembly varies as the head is moved radially to different data tracks because the angular velocity of the rotating disks at the outer tracks is greater than that at the inner tracks. Maintaining a near constant flying height over the disk surface is desirable because it allows the average fly height from inner to outer radius to be reduced thus allowing a higher storage density without reducing reliability.

One way of providing for a near constant magnetic head-to-disk spacing is to use a self-loading negative pressure air bearing slider. By providing a negative pressure air bearing as described in U.S. Pat. No. 4,475,135 issued Oct. 2, 1984, to Warner et al . . . differences in air track speed between an inner and outer track on a rotating disk cause compensating changes in the positive and negative pressures on the air bearing slider which result in a near constant magnetic head-to-disk spacing.

The manufacture of a negative pressure air bearing designed to fly at very low flying heights relative to the disk surface is difficult. A process which provides repeatable, physical dimensions of the magnetic head slider and employs a laser is disclosed in pending U.S. patent application Ser. No. 06/910593, now U.S. Pat. No. 4,785,161, filed Sept. 23, 1986 and is assigned to the same assignee as the present invention. In the design known to the art, machining by various means must be made to the trailing edge of the magnetic head slider. The machining employed must remove material from the thin film magnetic transducer assembly. The present invention is a side-vented magnetic head air bearing slider which eliminates the need to machine the thin film transducer assembly material.

SUMMARY OF THE INVENTION

The present invention is a self-loading negative pressure air bearing for supporting transducer elements made up of a support structure having leading and trailing edges. Extending along the side edges of the support structure are a pair of spaced-apart side rails. A cross rail is disposed laterally across the surface of the structure joining the side rails. Together the cross rail and side rails define a recessed section being closed on three sides by the rails. Notched on each side rail near the trailing edge of the support structure are side vents for allowing the recessed section to communicate with ambient air pressure. This structure provides a negative pressure region to be established in the recessed section while positive pressure regions are established at the side rails whereby the surface of the support structure can fly in close proximity to a confronting planar surface such as a magnetic disk at a substantially constant height over a wide variation of disk speed.

It is to be noted that the use Of the terms positive pressure and negative pressure means pressure relative to the ambient pressure. The ambient gas need not be air but refers to the gas medium surrounding the slider/disk combination.

The side-vented negative pressure air bearing slider provides good stability by having a high stiffness requiring a large force to move it in an up or down direction. The modified self-loading air bearing slider retains the characteristics of a near constant disk-to-head flying height. No machining is required in the transducer assembly region of the air bearing slider.

DETAILED DESCRIPTION OF THE PREFERRED EMBODIMENT

Figure 1:
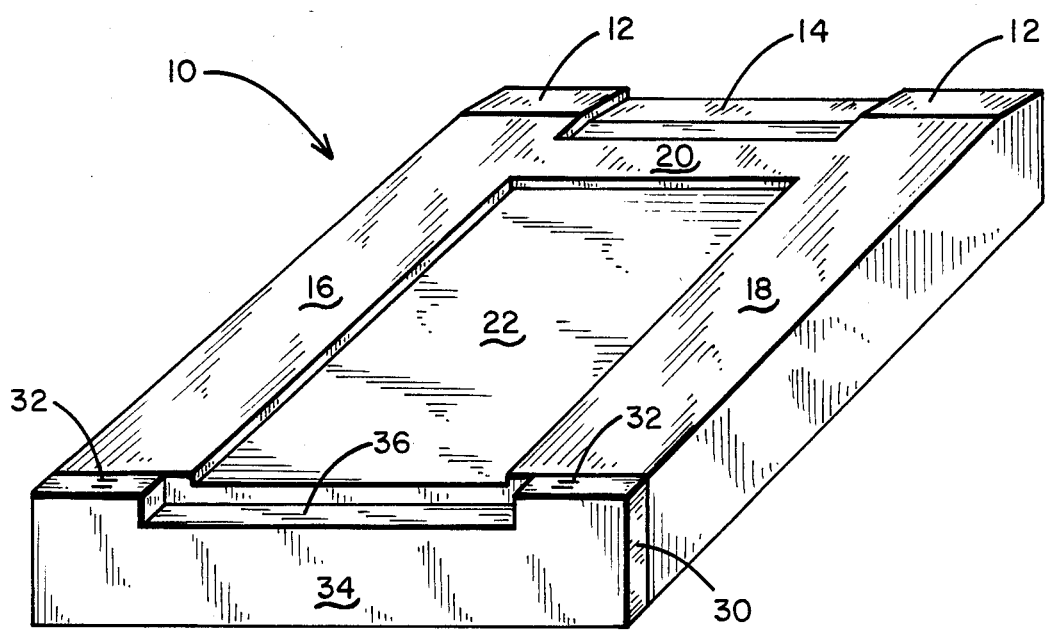
FIG. 1 is a perspective view of a prior art slider.

Shown in FIG. 1 is a negative pressure air bearing formed from a substantially rectangular block 10 of ceramic material such as ferrite. The slider is shown with a leading edge taper 12 and a stepped leading edge cavity 14. Side rails 16 and 18 extend along the length of the slider body.

Connecting the side rails is cross rail 20. The side rails and cross rail form a substantially coplanar surface. The three rails enclose a recessed section 22 which forms a trailing cavity. At the trailing edge of the slider body is a thin film transducer assembly 30. This assembly can be integrally formed on the slider body or be attached by glue or glass bonding prior to the machining of the air bearing slider surface. As shown in this prior art example, the pole tips 32 are the transducer elements for which a close disk spacing is desired. The pole tips lie in the same plane defined by the side rails.

The formation of the leading and trailing cavities can be made by machining, chemical etching, ion milling, or preferably by laser machining as disclosed in pending application Ser. No. 06/910,593, now U.S. Pat. No. 4,785,161, having a common assignee as the present invention. In laser machining, particularly with a Nd:YAG laser, ceramic materials like ferrite and aluminum oxide/titanium carbide composites are easily machined whereas thin film deposits of pure aluminum oxide do not as easily absorb the laser energy and vaporize. The oxide 34 used for encapsulation of the thin film assembly tends to chip or crack easily and thus is not compatible for laser machining with the same operating conditions useful for the ceramics. In the prior art shown, the oxide and other materials have been removed in the area depicted by numeral 36 so that only ceramic slider material need be machined at the time the recessed cavity 22 is formed. The selective removal of the encapsulation oxide 34 requires a separate photomask operation followed by chemical etching, ion milling, or reverse mask lift-off of the area shown by 36.

Figure 2:
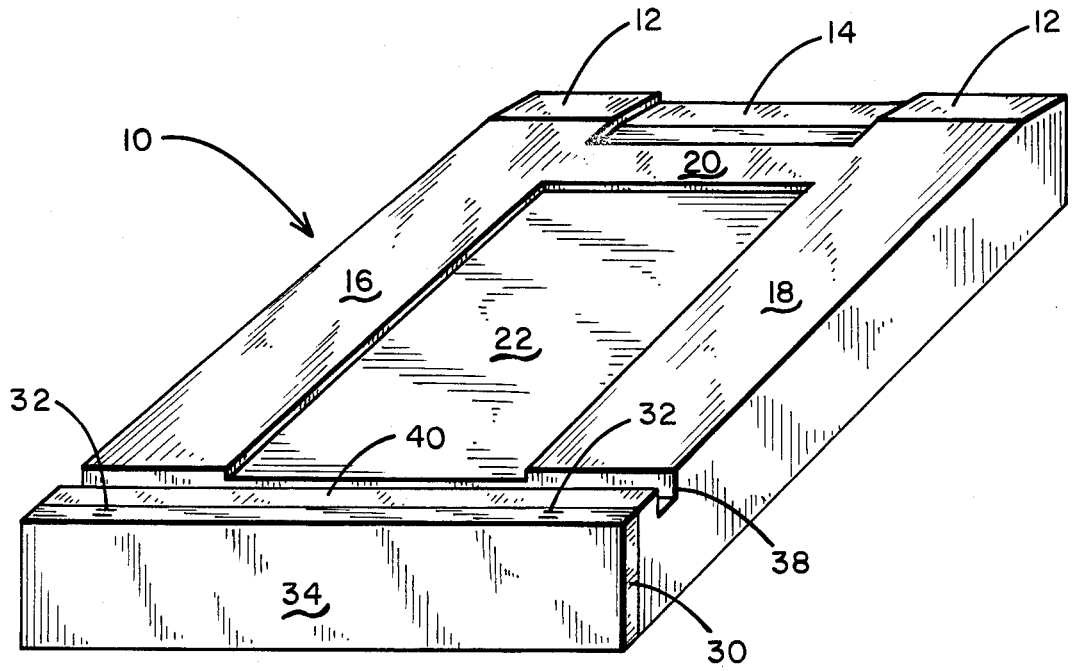
FIG. 2 is a perspective view of the present invention.

FIG. 2 shows the preferred embodiment of the present invention. The basic negative pressure air bearing pattern having side rails and cross rail (or bar) is used. A slider body 10 having a tapered leading edge 12 and a leading edge stepped cavity 14 is shown. Similar to the prior art side rails 16 and 18 as well as cross rail 20 are formed on a coplanar surface of the slider body. The three nails together form a recess whose depth relative to the side rails is preferably between 20 and 30 microinches. Integral with the slider body is a thin film transducer assembly 30 having pole tips 32 and encapsulating oxide 34. Machined near the trailing edge of the slider body is side vent groove 38. The side venting groove must be sufficiently large so that when the slider is flying above a disk, the air that passes between the slider and the media surface can freely flow to either side of the slider through the side vent grooves, and the negative pressure within the trailing cavity will not be affected. The minimum size for this side vent groove is in the order of 0.004 inch wide by about 0.002 inch deep. The actual cross sectional shape of this side vent groove 38 need not be rectangular. The primary requirement is that its cross sectional area be sufficient so air flow within it is not significantly restricted. Rearward of the side vent groove is the trailing edge cross rail 40 which is made up of a sufficient portion of the slider body material 10 adjacent to the transducer assembly 30 to mechanically support it. The width of this trailing cross bar is kept to a minimum, being approximately 0.003 inch to 0.005 inch wide to retain known desirable features of a negative pressure air bearing. The surface of the trailing cross rail 40, and pole tips 32 are coplanar with the side rails 16 and 18 and cross bar 20.

The use of side vent grooves avoids the need for the selective removal of the encapsulation oxide from the transducer assembly layer as shown by trailing edge cavity 36 while preserving the basic negative pressure air bearing characteristics. The side-vented negative pressure air bearing pattern can be cut by a laser with no damage to the transducer assembly. Since the trailing edge of the air bearing surface is not cut there is no need to tilt the parts or perform a double alignment of the slider assembly during machining. The entire trailing edge flies at close proximity to a disk and that provides more area for multipe head transducer structures. The design does not preclude the use of ion milling or chemical etching in the manufacturing process of the air bearing slider. It is expected that the deeper side vent cut may be also implemented by conventional diamond saw cutting methods. Since the entire width of the trailing edge of the slider can be made to fly in close proximity to the disk surface, this design can be more effective in a media screening test (referred to as a Flying Integrity Test or FIT test) as a low flying detector of bumps, asperites or imperfections on the surface of magnetic disk media.

Figure 3B:
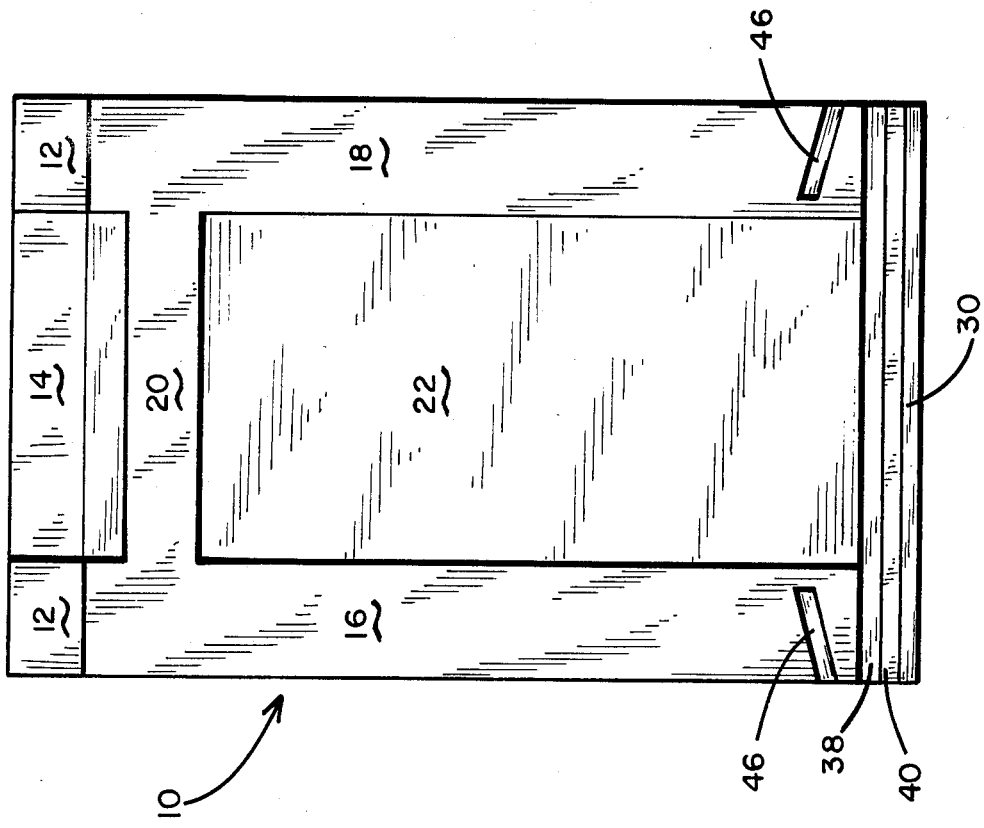
FIGS. 3a and 3b are top plan views of alternative embodiments of the present invention.
Figure 3A:
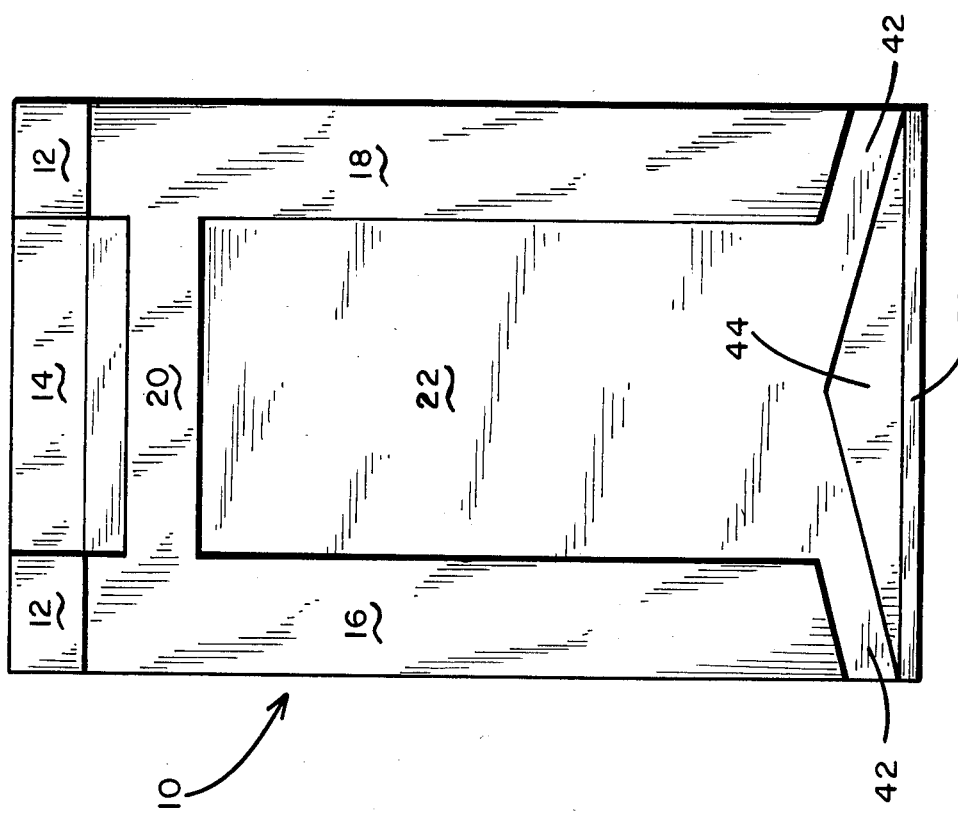

Shown in FIG. 3a is an alternative embodiment of the preferred invention wherein the air bearing surface has a recessed cavity 22 with angled side vent openings 42 and a triangular trailing edge cross rail or bar 44. The angled side vent opening 42 may be tapered and the actual angles and break points may vary over a wide range. This figure shows the width of side vent 42 being greater than side vent 38 shown in FIG. 2, but having a depth the same as recessed cavity 22. This variation might provide greater processing ease.

Another alternative embodiment has a deep side vent notch 46, as shown in FIG. 3b in the side rails to aid in the reduction of positive pressure from going into the side vent groove 38. Positioning of the notch relative to the side vent groove also offers some control in the balance of positive and negative forces on the slider which affect the fly height versus speed response of the slider. The side vent notch 46 reduces the positive pressure of the side rails before the positive pressure reaches the side vent groove 38. This can help the side vent groove in providing a subambient pressure within the recessed cavity 22.

Figure 4:
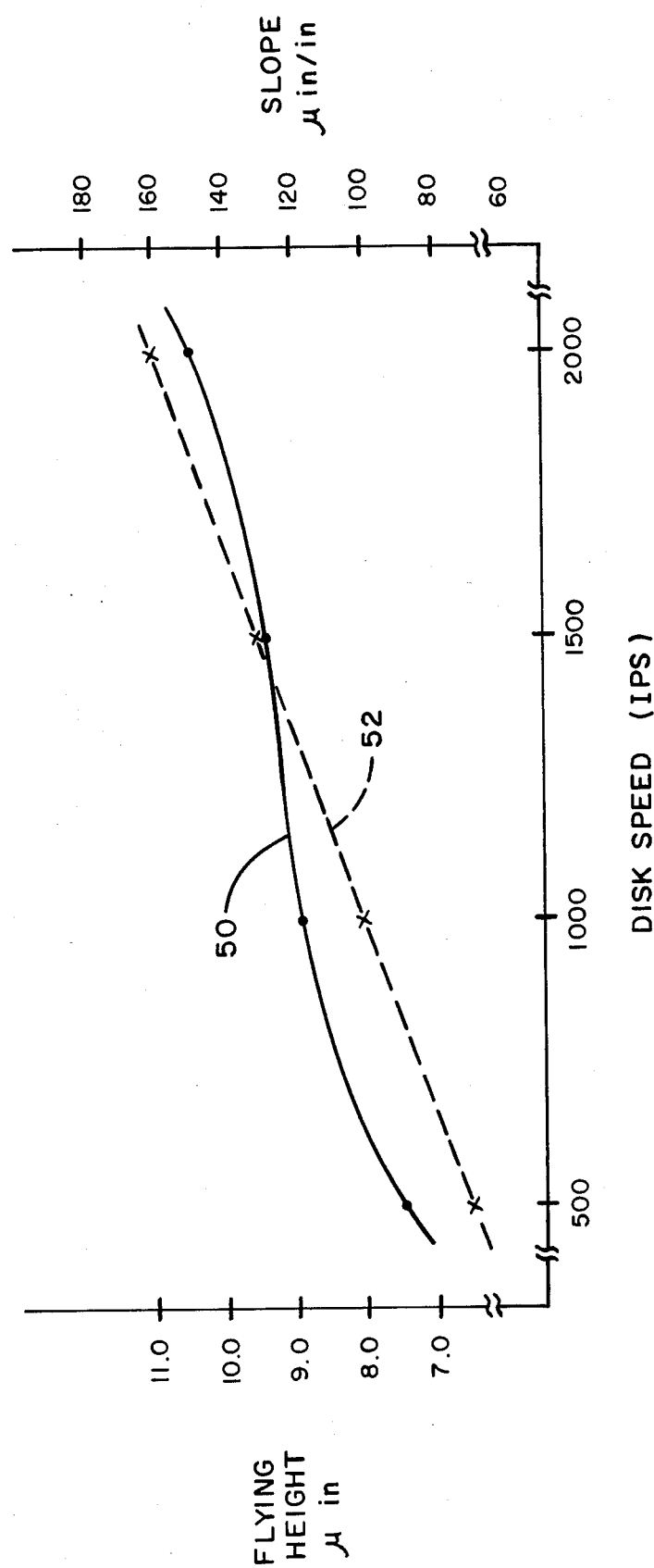
FIG. 4 is a graph plotting both flying height and slope of the slider versus disk speed for air bearing sliders of the present invention.

FIG. 4 illustrates by curve 50 the near constant flying height of the self-loading slider of this present invention over a disk speed variation of four times. Curve 52 shows the slope of the slider as a function of disk speed. The slope or pitch defined on the right vertical axis is a measure of the difference in flying height of the leading edge over the trailing edge for the slider given in microinches per inch. The results shown in FIG. 4 are for a slider having the shape of FIG. 2 with the side vent being 9.6 mils wide and approximately 2 mils deep.

What has been developed is a self-loading air bearing slider for supporting transducer elements which can be easily machined and manufactured yet retains the desired features of a negative pressure air bearing having near constant disk to transducer flying height over a wide variation of disk speeds. It is to be understood that the slider configuration and rail geometries disclosed herein may be modified within the scope of this invention.

What is claimed is:

1. A self-loading air bearing slider comprising:
a slider having leading and trailing edges, two side edges and an air bearing surface, wherein the air bearing surface is adapted to ride on gas flowing from said leading edge to said trailing edge, said gas outside said air bearing surface having an ambient pressure;
a negative pressure recess formed in the center of said air bearing surface, the negative pressure recess having two side edges and a negative pressure surface, the pressure in said recess being negative relative to ambient pressure as gas flow across said air bearing surface, the said edges each having leading and trailing ends; and
a pair of vents each communicating between the trailing end of respective side edges of said negative pressure recess and a corresponding one of said slider side edges, the vents having a sufficiently large cross section so that air flowing through said negative pressure recess when the slider is riding on an air bearing vents through said vents without significant restriction;
wherein said negative pressure recess has a predetermined depth relative to said air bearing surface and said vents comprise recesses in said air-bearing surface having a depth greater than said predetermined depth.

2. The slider of claim 1 wherein said vents comprise a channel communicating across the entire slider from one side edge to another.

3. A self-loading air bearing slider comprising:
a slider having leading and trailing edges, two side edges and an air bearing surface, wherein the air bearing surface is adapted to ride on gas flowing from said leading edge to said trailing edge, said gas outside said air bearing surface having an ambient pressure;

a negative pressure recess formed in the center of said air bearing surface, the recess having two side edges and a negative pressure surface, the pressure in said recess being negative relative to ambient pressure as gas flows across said air bearing surface, the side edges each having leading and trailing edges; and a pair of vents each communicating between the trailing end of respective side edges of said negative pressure recess and a corresponding one of said slider side edges, the vents having a sufficiently large cross section so that air flowing through said negative pressure recess when the slider is riding on an air bearing vents through said vents without significant restriction;

wherein said negative pressure recess has a predetermined depth relative to said air bearing surface and said vents comprise inclined recesses in said air-bearing surface having a depth equal to said predetermined depth, the direction of inclination being such that gas flows from said negative pressure recess to said side edges.

* * * * *